United States Patent
Klemen

[19]

[11] Patent Number: 5,971,883
[45] Date of Patent: Oct. 26, 1999

[54] MULTI-SPEED POWER TRANSMISSION

[75] Inventor: Donald Klemen, Carmel, Ind.

[73] Assignee: General Motors Corporation, Detroit, Mich.

[21] Appl. No.: 09/041,652

[22] Filed: Mar. 13, 1998

[51] Int. Cl.$^6$ ..................................................... F16H 3/44
[52] U.S. Cl. ........................................ 475/296; 475/218
[58] Field of Search ................................. 475/296, 200, 475/218, 210, 211

[56] References Cited

U.S. PATENT DOCUMENTS

| | | | |
|---|---|---|---|
| 4,614,133 | 9/1986 | Nerstad et al. | 475/218 |
| 5,013,289 | 5/1991 | Van Maanen | 475/218 |
| 5,149,307 | 9/1992 | Malloy et al. | 475/200 |
| 5,520,588 | 5/1996 | Hall, III | 475/218 |
| 5,573,471 | 11/1996 | Shubinsky et al. | 475/218 |

*Primary Examiner*—Charles A. Marmor
*Assistant Examiner*—Tisha D. Waddell
*Attorney, Agent, or Firm*—Dean L. Ellis; Donald F. Scherer

[57] ABSTRACT

A simple planetary gearset and four transfer gear pairs are combined to provide five forward speed ratios and two reverse speed ratios in a power transmission. Three selectively engageable clutches controlling three of the transfer gear pairs are engaged in combination with two selectively engageable friction devices controlling the simple planetary gearset to establish four of the forward speed ratios and the two reverse ratios. A fourth selectively engageable clutch, controlling the fourth transfer gear pair establishes a forward ratio numerically central of the aforementioned four forward ratios.

4 Claims, 1 Drawing Sheet

MULTI-SPEED POWER TRANSMISSION

TECHNICAL FIELD

This invention relates to multi-speed power transmissions, and more particularly, to such transmissions having in combination a countershaft gearing assembly and a planetary gearing assembly.

BACKGROUND OF THE INVENTION

Multi-speed power transmissions are utilized with motor vehicles to extend the useful operating range of an internal combustion engine. Each of the speed ranges permits the engine to operate through approximately the entire power range thereby permitting the vehicle to be driven at output speeds from an idle condition to a maximum forward speed or to a maximum reverse speed. The gear ratios and engine power range permit overlapping of the power transmission such that the engine need not be fully extended prior to changing to the next speed up or down from the current operating position.

The power transmissions currently in use are generally either countershaft transmissions or planetary transmissions. The countershaft transmission can have the various speed ratios controlled by synchronizer type clutches or by fluid actuated type clutches. The planetary gear arrangements utilize selectively engageable friction devices, such as clutches and brakes, to establish as many speed ratios a planetary gear arrangement is capable of attaining.

There are also some combinations of planetary and transfer gear or countershaft gearing assemblies. These assemblies generally utilize a compound planetary gearset or a plurality of interconnected planetary gearsets.

SUMMARY OF THE INVENTION

It is an object of the present invention to provide an improved multi-speed power transmission having a countershaft arrangement and a planetary arrangement combined to provide a plurality of forward and reverse ratios.

In one aspect of the invention, a countershaft arrangement includes four pair of transfer gears, one of which provides a reversing operation, and a simple planetary gearset. The planetary gearset is controlled by a pair of selectively engageable friction devices to provide an underdrive ratio and a direct drive ratio. The countershaft arrangement and transfer gears thereon are controlled with selectively engageable friction clutches.

In another aspect of this invention, each of the friction clutches controlling the transfer gear pairs are selectively engaged in combination with the two selectively engageable friction devices of the planetary gear arrangement to provide four forward speeds and two reverse speeds.

In yet another aspect of this invention, one of the forward speeds, the numerically central speed, uses one pair of transfer gears to provide a direct drive connection between the countershaft and the output of the transmission.

DESCRIPTION OF THE PREFERRED EMBODIMENT

Figure 1:
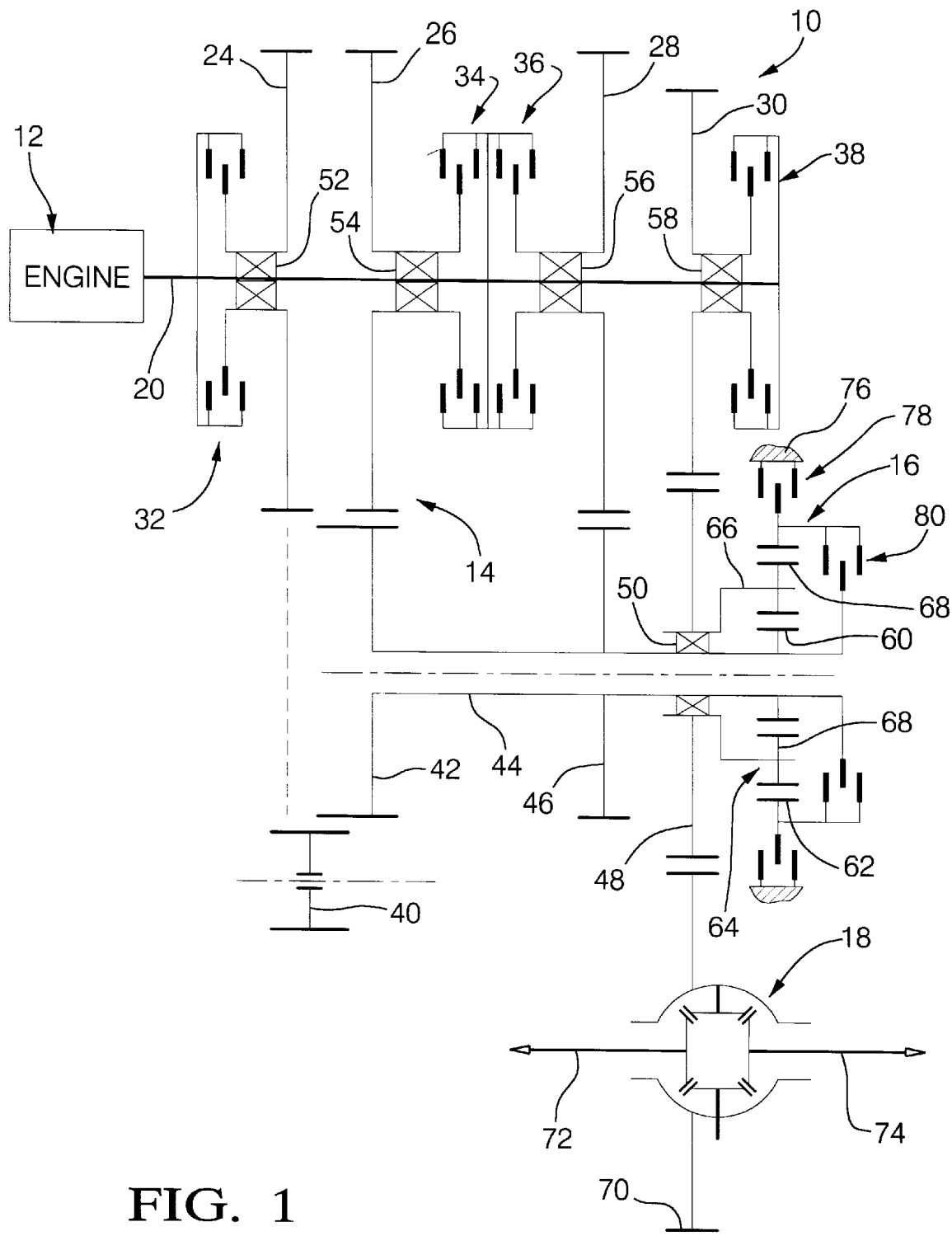
FIG. 1 is a schematic representation of a power transmission incorporating the present invention.

Referring to the drawing, there is seen a powertrain, generally designated 10, including an engine 12, a transfer gear train assembly 14, a simple planetary gear assembly 16 and a conventional differential assembly 18. The engine 12 is drivingly connected with a transmission input shaft 20 on which are rotatably mounted a plurality of input transfer gears 24, 26, 28 and 30. Each of the gears 24, 26, 28 and 30 are selectively connectible with the input shaft 20 to respectively selectively engageable clutches, such as reverse clutch 32, first clutch 34, second clutch 36 and third clutch 38.

The input gear 24 is meshingly engaged with an idler gear 40, which in turn meshes with a transfer gear 42. Transfer gear 42 is drivingly connected with or otherwise secured to a planetary input shaft 44. The transfer gear 42 also meshes with the input gear 26.

The input gear 28 meshes with a transfer gear 46 which is also drivingly connected with the planetary input shaft 44. The input gear 30 is drivingly connected with a transfer gear 48 which is rotatably mounted on the planetary input shaft 44 through a conventional bearing 50.

Each of the input gears 24, 26, 28 and 30 are rotatably mounted on the input shaft 20 through respective conventional bearings 52, 54, 56 and 58. The use of bearings between the input gears 24, 26, 28 and 30 and the input shaft 20 reduce the friction losses within the transmission. When each of the input gears 24, 26, 28 and 30 is transmitting power from the engine 12, the engagement of the respective clutch 32, 34, 36 and 38 ensures the respective gear and input shaft 20 are rotating at a common speed and therefore the bearing is not supporting a load and simultaneously having a speed differential between the inner and outer races thereof.

Planetary input shaft 44 is drivingly connected or otherwise secured with a sun gear 60 which is a member of the simple planetary gearset 16. Gearset 16 also includes a ring gear 62 and a planet carrier assembly 64. The planet carrier assembly 64 has a cage 66 on which is rotatably mounted a plurality of planet pinion members 68 which mesh between the sun gear 60 and the ring gear 62 in a well known manner.

Cage 66 is drivingly connected with the transfer gear 48. Transfer gear 48 is also connected with an output gear 70 which is a component of the differential assembly 18. The differential assembly 18 provides a pair of output shafts 72 and 74 which are connected in a well known manner to the driven wheels of a vehicle, not shown.

The ring gear 62 is selectively connected with a housing 76 through a selectively engageable friction device or brake 78. The sun gear 60 is selectively connectible with the ring gear 62 through the selective engagement of a selectively engageable friction device or clutch 80.

The brake 78 and clutch 80 are constructed in a well known manner. Preferably these devices consist of a plurality of interspersed friction plates connected to each of the components, for example, the housing 76 and ring gear 62 for the brake 78, or the ring gear 62 and sun gear 60 for the clutch 80. As is well known, engagement of the brake 78 will cause the ring gear 62 to be held stationary while the engagement of the clutch 80 will cause the ring gear 62, sun gear 60 and planet carrier assembly 64 to rotate as a single unit. Quite obviously, the brake 78 and clutch 80 cannot be fully engaged simultaneously.

Hydraulic systems for controlling the engagement and interchange of such friction devices is well known and many of which can be used to control the actuation and de-actuation of brake 78 and clutch 80, and also the actuation of clutches 32, 34, 36 and 38.

The clutches 32, 34 and 36 are selectively engaged individually with combinations of the brake 78 and the clutch 80. These engagement combinations will provide four forward speed ratios and two reverse speed ratios in the following manner. The engagement of clutch 38 provides a direct drive between the shaft 20 and gear 70.

The engagement of clutch 34 will provide an input drive from the shaft 20 to the shaft 44, through transfer gears 26 and 42, which will drive the sun gear 60 of planetary gearset 16. With the brake 78 engaged, the cage 66 will be rotated at a reduced speed thereby driving the gear 48 and gear 70 which meshes therewith. Rotation of gear 70 will cause an output rotation for the shafts 72 and 74 of the differential 18.

To establish the second forward ratio, the clutch 34 is disengaged while the clutch 36 is engaged and the brake 78 remains engaged. This causes an input drive from the shaft 20 through transfer gears 28 and 46, which again result in rotation of the sun gear 60 and the rotation of the gears 48 and output gear 70.

To establish the third forward ratio, the clutch 38 is engaged while the clutch 36 and brake 78 are disengaged. With the clutch 38 fully engaged, the power flow is from the shaft 20 through gears 30 and 48 to the gear 70, which in turn, as previously mentioned, drives the output shafts 72 and 74.

While the clutch 38 is engaged, the clutch 80 can also be engaged since the planetary gearset 16 is rotating as a unit during the third ratio. The engagement of clutch 80 will bring the gears into synchronization to ensure that the planetary is rotating in its direct drive ratio.

To establish the fourth forward ratio, the clutch 38 is disengaged while the clutch 34 is engaged. This provides the drive ratio through the gears 26 and 42 and planetary gearset 16 to the gear 70 and therefore the output shafts 72 and 74.

To establish the fifth and highest speed ratio, the clutch 34 is disengaged while the clutch 36 is engaged thereby utilizing the transfer gears 28 and 46 to provide the drive to the planetary input shaft 44.

Two reverse drive ratios are provided through the combination of gears 24, 40 and 42, and the planetary gearset 16. The engagement of clutch 32 provides for power transmission from the engine to the gear 24 which is then transferred and reversed in rotation to the transfer gear 42. This drives the sun gear 60 in a direction opposite to the direction it is driven in the forward speeds. The brake 78 is engaged to provide the lowest reverse ratio which will result in an underdrive in the planetary gearset 16 and the gear 70 will be driven in a reverse direction in a manner similar to that described above for first gear.

To establish the higher reverse ratio, the brake 78 is disengaged while the clutch 80 is engaged thereby placing the planetary gearset 16 in the direct ratio.

The following gear tooth numbers are given by way of example and are not meant to be limiting.

The gears 24, 26 and 42 all have fifty teeth. The gears 28 and 48 have sixty teeth and the gears 30 and 46 have forty teeth. In the planetary gearset 16, the sun gear 60 has twenty-nine teeth and the ring gear 62 has sixty-seven teeth. The idler gear 40 can have any number of teeth since it really reverses rotation direction, but in the embodiment disclosed herein, the idler gear 40 has twenty-three teeth.

The combination of the transfer gears 26 and 42 with the simple planetary gearset 16 established in the low ratio, an overall speed ratio of 3.31 between the input shaft 20 and the output gear 70 is provided. In the second forward ratio utilizing the combination of transfer gears 28 and 46, a speed ratio of 2.25 is provided. In the third forward ratio, the transfer gears 30 and 48 provide a ratio of 1.5 between the input shaft 20 and the gear 70.

In the fourth ratio, with the clutch 70 engaged and the brake 78 disengaged, the transfer gears 26 and 42 will establish a 1:1 or direct ratio between the input shaft 20 and the gear 70. In the fifth and highest speed ratio, the transfer gears 28 and 46 will establish an overdrive ratio of 0.67 between the transmission input and output.

The lowest reverse ratio is established as described above with the engagement of clutch 32 and brake 78. This ratio is equal to the lowest forward speed ratio except it is in a negative direction so that the reverse low is 3.31. The high reverse ratio is similar to the fourth forward gear ratio, only in a negative direction so that the high reverse ratio is a −1.

The use of the countershaft arrangement provides for increased ratio coverage in a power transmission when compared to a planetary gear arrangement providing five forward speeds. This is because of the countershaft section providing a very high degree of ratio flexibility. The tooth numbers on the transfer gears can be adjusted to provide exactly the ratios desired between the shafts 20 and 44 without significant changes in the planetary gearset 16. However, the planetary gearset 16 can also be changed in numbers to provide a different low ratio.

The use of the countershaft transmission portion also permits the rotating clutches 32, 34, 36 and 38 to be placed on the input shaft thereby reducing the torque capacity necessary for these clutches. It should also be obvious to those skilled in the art that the friction losses are greatly reduced by providing the clutches on input shaft as seen. It should be noted that in the upper speed ranges, the planetary gearset 16 is in a 1:1 condition which greatly reduces the spin losses generally associated with spinning planetary gearsets.

One further advantage that should be noted is the similarity in tooth numbers, actually the identity in tooth numbers between gears 24, 26 and 42, between gears 28 and 48, and between gears 30 and 46. This will, of course, reduce the amount of tooling necessary to cut the gear teeth or to form the gear teeth on blanks.

This transmission design also permits the low forward and low reverse ratios to be identical since a parallel path is utilized in the low forward and reverse ranges. Also, the clutches which are disposed on the input shaft 20 can be substantially identical thereby reducing the number of clutch plates that is necessary to manufacture.

I claim:

1. A power transmission comprising:
   a simple planetary gearset having a sun gear member, a ring gear member and a carrier assembly having a plurality of pinion gears meshing with said sun gear and said ring gear;
   a first selectively engageable friction device operatively connected with said simple planetary gearset for establishing a first ratio in said simple planetary gearset;
   a second selectively engageable friction device operatively connected with said simple planetary gearset for establishing a second ratio in said simple planetary gearset;
   an output shaft drivingly connected with said carrier assembly member for providing a power output from the transmission;
   a planetary input shaft drivingly connected with one member of said simple planetary gearset;
   a transmission input shaft disposed in parallel relation with said planetary input shaft;

a first pair of input transfer gears and a first selectively engageable clutch operatively connected therewith for providing a first input ratio between said transmission input shaft and said planetary input shaft;

a second pair of input transfer gears and a second selectively engageable clutch operatively connected therewith for providing a second input ratio between said transmission input shaft and said planetary input shaft;

a third pair of input transfer gears and a third selectively engageable clutch operatively connected therewith for providing a third input ratio between said transmission input shaft and said output shaft;

a reverse transfer gear train and a selectively engageable reverse clutch for providing a reverse ratio between said transmission input shaft and said planetary input shaft; and said first clutch and said first and second friction devices only being selectively engaged to provide a first and fourth forward transmission ratio between said transmission input shaft and said output shaft, said second clutch and said first and second friction devices only being selectively engaged to provide a second and fifth forward transmission ratio between said transmission input shaft and said output shaft, said third clutch only being selectively engaged to provide a third speed ratio between said transmission input shaft and said output shaft, and said reverse clutch and said first and second friction devices only being selectively engaged to provide a first reverse ratio and a second reverse ratio between said transmission input shaft and said output shaft.

2. The power transmission defined in claim 1, wherein said third pair of transfer gears and said third selectively engageable clutch establish a connection directly between said transmission input shaft and said transmission output shaft.

3. The power transmission defined in claim 1, wherein said first selectively engageable friction device is a brake and said second selectively engageable friction device is a clutch.

4. The power transmission defined in claim 1, wherein the first, second and third forward transmission ratios are underdrive ratios, said fourth forward transmission ratio is a 1:1 ratio, and said fifth forward transmission ratio is an overdrive ratio.

* * * * *